(12) United States Patent
Aggarwal et al.

(10) Patent No.: US 6,360,227 B1
(45) Date of Patent: Mar. 19, 2002

(54) SYSTEM AND METHOD FOR GENERATING TAXONOMIES WITH APPLICATIONS TO CONTENT-BASED RECOMMENDATIONS

(75) Inventors: Charu Chandra Aggarwal, Yorktown Heights, NY (US); Stephen C. Gates, Redding, CT (US); Philip Shi-Lung Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/240,231

(22) Filed: Jan. 29, 1999

(51) Int. Cl.[7] .............................................. G06F 17/00
(52) U.S. Cl. ..................... 707/102; 707/103 D; 707/10; 707/5; 709/219; 725/116; 345/428
(58) Field of Search ................................ 707/1–10, 104, 707/501; 370/390; 378/4

(56) References Cited

U.S. PATENT DOCUMENTS

| | | | | |
|---|---|---|---|---|
| 5,265,065 A | * | 11/1993 | Turtle | 707/4 |
| 5,442,778 A | * | 8/1995 | Pedersen et al. | 707/5 |
| 5,488,725 A | * | 1/1996 | Turtle et al. | 707/5 |
| 5,694,594 A | * | 12/1997 | Chang | 707/6 |
| 5,708,767 A | * | 1/1998 | Yeo et al. | 707/501 |
| 5,740,421 A | * | 4/1998 | Palmon | 707/4 |
| 5,873,081 A | * | 2/1999 | Harel | 707/3 |
| 5,943,669 A | * | 8/1999 | Numata | 707/5 |
| 5,974,412 A | * | 10/1999 | Hazlehurst et al. | 707/3 |
| 5,983,224 A | * | 11/1999 | Singh et al. | 707/6 |
| 6,029,161 A | * | 2/2000 | Lang et al. | 707/1 |
| 6,029,195 A | * | 2/2000 | Herz | 707/10 |
| 6,067,340 A | * | 5/2000 | Eppstein et al. | 378/4 |
| 6,091,724 A | * | 7/2000 | Chandra et al. | 370/390 |
| 6,115,708 A | * | 9/2000 | Fayyad et al. | 707/6 |
| 6,144,962 A | * | 11/2000 | Weinberg et al. | 707/10 |
| 6,154,213 A | * | 11/2000 | Rennison et al. | 707/104 |
| 6,177,932 B1 | * | 1/2001 | Galdes et al. | 707/200 |

OTHER PUBLICATIONS

Douglas R. Cutting et al., "Constant interaction–time scatter/gather browsing of large document collections", Proceedings of the ACM SIGIR, 1993.

Douglas R. Cutting et al., "Scatter/Gather: A cluster–based Approach to Browsing Large Document Collections", Proceedings of the ACM SIGIR, pp. 318–329, 1992.

Marti A. Hearst et al., "Re–Examining the cluster hypothesis: Scatter/Gather on Retrieval Results", Proceedings of the ACM SIGIR, pp. 76–84, 1996.

P.G. Anick et al., "Exploiting clustering and phrases for Context–Based Information Retrieval", Proceedings of the ACM SIGIR, pp. 314–321, 1997.

H. Schutze et al., "Projections for efficient document clustering", Proceedings of the ACM SIGIR, pp. 74–81, 1997.

* cited by examiner

*Primary Examiner*—Hosain T. Alam
*Assistant Examiner*—Anh Ly
(74) *Attorney, Agent, or Firm*—F. Chau & Associates, LLP

(57) ABSTRACT

A graph taxonomy of information which is represented by a plurality of vectors is generated. The graph taxonomy includes a plurality of nodes and a plurality of edges. The plurality of nodes is generated, and each node of the plurality of nodes is associated with ones of the plurality of vectors. A tree hierarchy is established based on the plurality of nodes. A plurality of distances between ones of the plurality of nodes is calculated. Ones of the plurality of nodes are connected with other ones of the plurality of nodes by ones of the plurality of edges based on the plurality of distances. The information represented by the plurality of vectors may be, for example, a plurality of documents such as Web Pages.

36 Claims, 11 Drawing Sheets

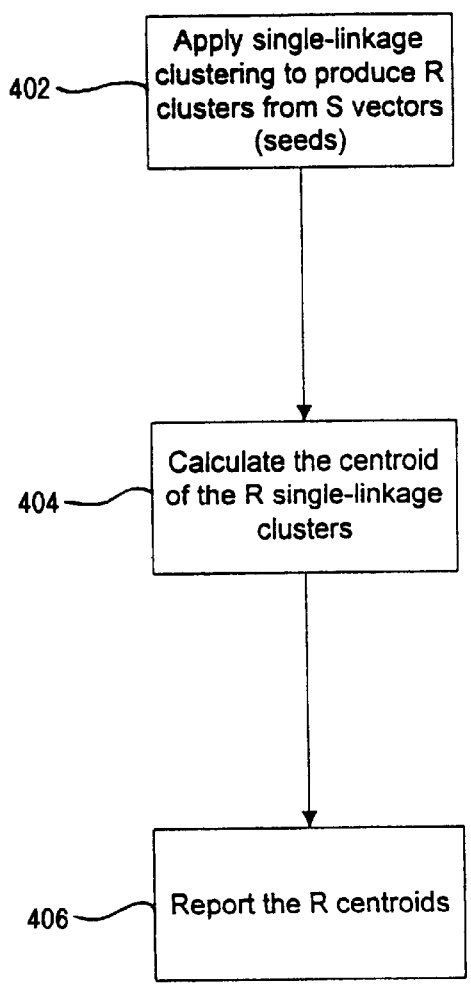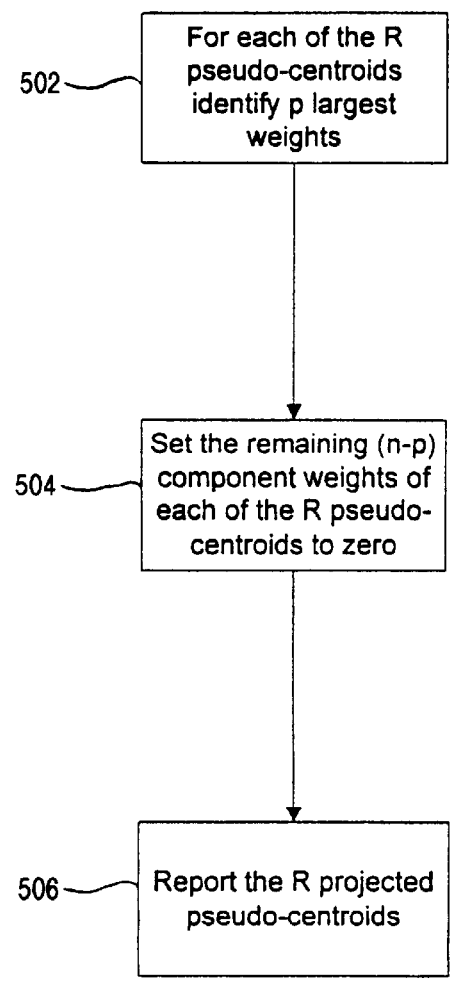
FIG. 4
FIG. 5

SYSTEM AND METHOD FOR GENERATING TAXONOMIES WITH APPLICATIONS TO CONTENT-BASED RECOMMENDATIONS

FIELD OF THE INVENTION

The present invention relates generally to generating graph taxonomies and to making content-based recommendations. In particular, related information is classified using a directed acyclic graph. Furthermore, the present invention relates to an automated system and method for generating a graph taxonomy and for recommending to a user a group of documents in a subject area which is related to a document given by the user.

BACKGROUND OF THE INVENTION

The increased capability to store vast amounts of information has led to a need for efficient techniques for searching and retrieving of information. For example, much information may be found in various databases and on the World Wide Web. Often information may be preprocessed and organized in order to provide users quicker access to relevant documents or data records. In particular, searching for and retrieving information may be facilitated by grouping similar data objects into clusters. Further, groups of similar data objects or clusters may be arranged in a hierarchy. Thus, a hierarchy of clusters may form an abstract representation of stored information.

Electronic documents, for example, may be represented by a tree hierarchy. Each node of the tree hierarchy may represent a cluster of electronic documents, such as, for example, a group of Web pages. Edges connecting nodes of the tree hierarchy may represent a relationship between nodes. Each node in the tree may be labeled with a subject category. Edges of the tree connect higher level nodes or parent nodes with lower level nodes or child nodes. A special node in a tree hierarchy is designated as the root node or null node. The root node has only outgoing edges (no incoming edges) and corresponds to the $0^{th}$ or highest level of the tree. The level of a node is determined by the number of edges along a path connecting the node with the root node. The lowest level nodes of a tree are referred to as leaf nodes. Thus, a tree hierarchy may be used as a classification of information with the root node being the coarsest (all inclusive) classification and the leaf nodes being the finest classification.

FIG. 1 shows an exemplary tree hierarchy for data objects. In FIG. 1 the root node represents a cluster containing all the available information. Available information may be stored in data objects. Data objects may be, for example, Web pages or links. All data objects belong to the cluster represented by the root node (i.e. level 0). Data objects containing information relevant to the category "business" belong to a cluster represented by a level 1 node. Data objects containing information relevant to the category "recreation" also belong to a cluster also represented by a level 1 node. Further, data objects containing information relevant to the category "education" belong to a cluster represented by a level 1 node. The nodes labeled "business", "recreation", and "education" are all child nodes of the root node. The category "business" may be further subdivided into the leaf categories of "large business" and "small business", as indicated by two level 2 nodes. Nodes labeled "large business" and "small business" are both child nodes of the node labeled "business". The category "recreation" may be further subdivided into the leaf categories of "movies", "games", and "travel", as indicated by three level 2 nodes. Nodes labeled "movies", "games", and "travel" are all child nodes of the node labeled "recreation". The category "Education" may be further subdivided into the leaf categories of "High-Schools", "colleges", "Universities", and "institutes", as indicated by four level 2 nodes. Nodes labeled "High-Schools", "colleges", "Universities", and "institutes" are all child nodes of the node labeled "Education".

A tree hierarchy may serve as a guide for searching for a subject category of data objects in which a user may be interested. For example, a test document, containing keywords which indicate an area of interest, may be given by a user. Based on a test document a tree hierarchy of subject categories may be searched for a node which matches the subject area sought by the user. Once a matching subject area is found, information associated with the matching subject area may be retrieved by the user.

Typically, a tree hierarchy may be searched in a top down fashion beginning with the root node and descending towards the leaf nodes. At each stage of a search, edges or branches are assigned a score. The branch with the highest score indicates the search (descent) direction of the tree. As higher levels of the tree are searched first, and as higher levels are often associated with broader subjects, errors in matching subject areas may lead to erroneous recommendation. In other words, as attaching a descriptive label to higher level nodes may be difficult, an error in matching a subject area to nodes at the beginning of a top down search may lead to a search through irrelevant branches of the tree.

Forming a classification of data is referred to as generating a taxonomy (e.g. a tree hierarchy). The data which is used in order to generate a taxonomy is referred to as training data. The process of finding the closest matching subject area to a given test document is referred to as 'making content-based recommendations'. Methods for taxonomy generation and applications to document browsing and to performing recommendations have been previously proposed in the technical literature. For example, Douglas R. Cutting, David R. Karger, and Jan O. Pedersen, "Constant interaction-time scatter/gather browsing of large document collections," Proceedings of the ACM SIGIR, 1993; Douglas R. Cutting, David R. Karger, Jan O. Pedersen, and John W. Tukey, "Scatter/Gather: A cluster-based Approach to Browsing Large Document Collections," Proceedings of the ACM SIGIR, 1992, pp. 318–329; Hearst Marti A., and Pedersen J. O., "Re-examining the cluster hypothesis: Scatter/Gather on Retrieval Results," Proceedings of the ACM SIGIR, 1996, pp. 76–84, 1996; Anick P. G., and Vaithyanathan S., "Exploiting clustering and phrases for Context-Based Information Retrieval," Proceedings of the ACM SIGIR, 1997, pp. 314–322; and Schutze H., and Silverstein C., "Projections for efficient document clustering," Proceedings of the ACM SIGIR, 1997, pp. 74–81.

Exemplary applications of content-based recommendations methods are in facilitating a search by a user for information posted on the World Wide Web. The content of Web Pages may be analyzed in order to classify links to Web Pages in the appropriate category. Such a method is employed, for example, by WiseWire Corporation (recently acquired by Lycos Inc., http://www.lycos.com). Lycos builds a directory index for Web Pages using a combination of user feedback and so-called intelligent agents. Links to Web Pages may be organized in a hierarchical directory structure which is intended to deliver accurate search results. At the highest level of the hierarchy subject categories may be few and generic, while at the lower levels subject may be more specific. A similar directory structure may be found in other search engines such as that employed by Yahoo Inc. (http://www.yahoo.com).

SUMMARY OF THE INVENTION

A graph taxonomy of information which is represented by a plurality of vectors is generated. The graph taxonomy includes a plurality of nodes and a plurality of edges. The plurality of nodes is generated, and each node of the plurality of nodes is associated with ones of the plurality of vectors. A tree hierarchy is established based on the plurality of nodes. A plurality of distances between ones of the plurality of nodes is calculated. Ones of the plurality of nodes are connected with other ones of the plurality of nodes by ones of the plurality of edges based on the plurality of distances.

BRIEF DESCRIPTION OF THE DRAWINGS

The invention is best understood from the following detailed description when read in connection with the accompanying drawings. It is emphasized that, according to common practice, the various features of the drawings are not to scale. On the contrary, the dimensions of the various features are arbitrarily expanded or reduced for clarity.

FIG. 4 illustrates an exemplary procedure for determining R seeds from S seeds, R<S, using single-linkage clustering in accordance with an embodiment of the resent invention;

FIG. 5 illustrates an exemplary procedure for performing a projection in accordance with an embodiment of the present invention;

DETAILED DESCRIPTION OF THE INVENTION

Figure 1:
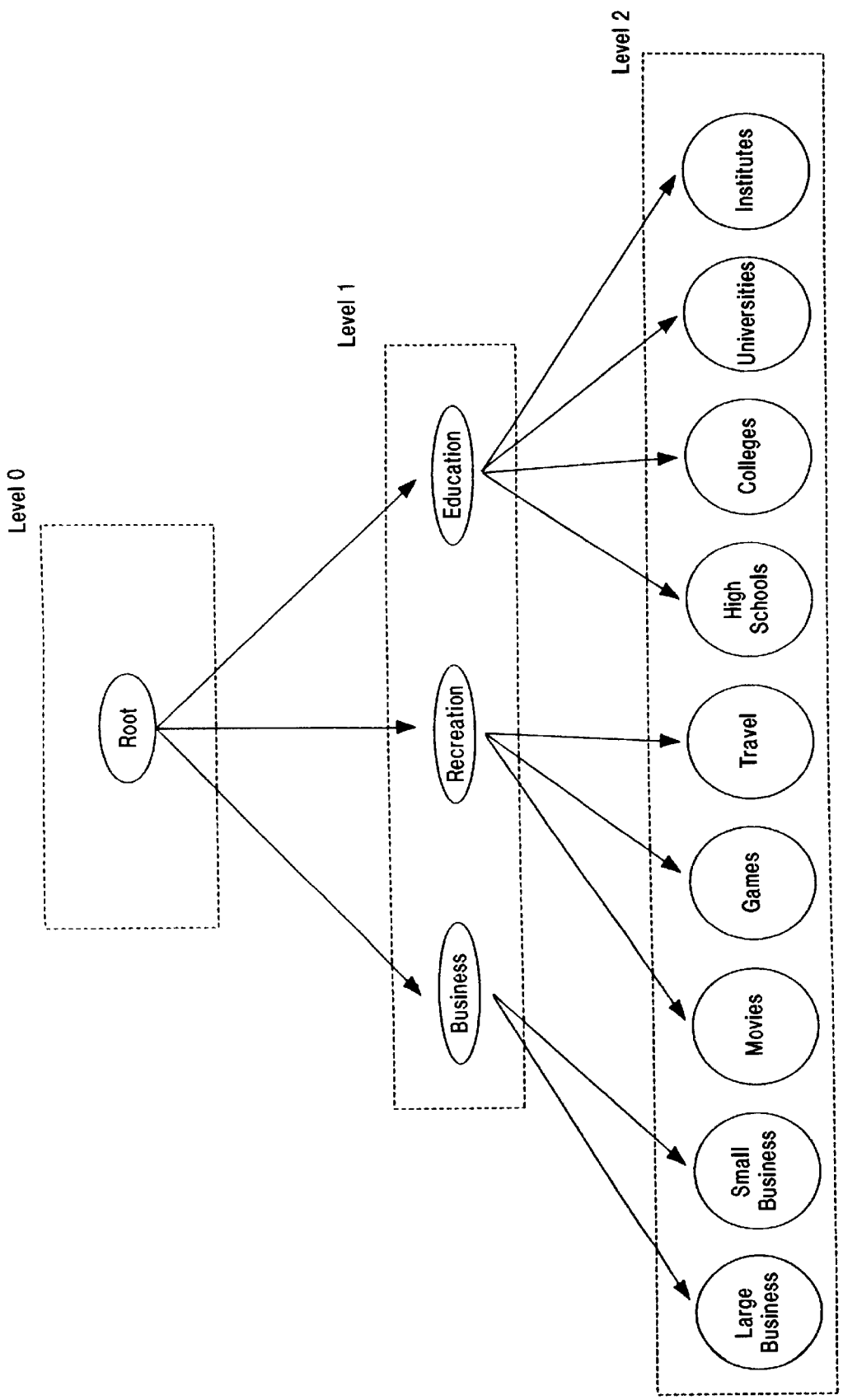
FIG. 1 Shows an exemplary tree hierarchy for data objects.
Figure 2:
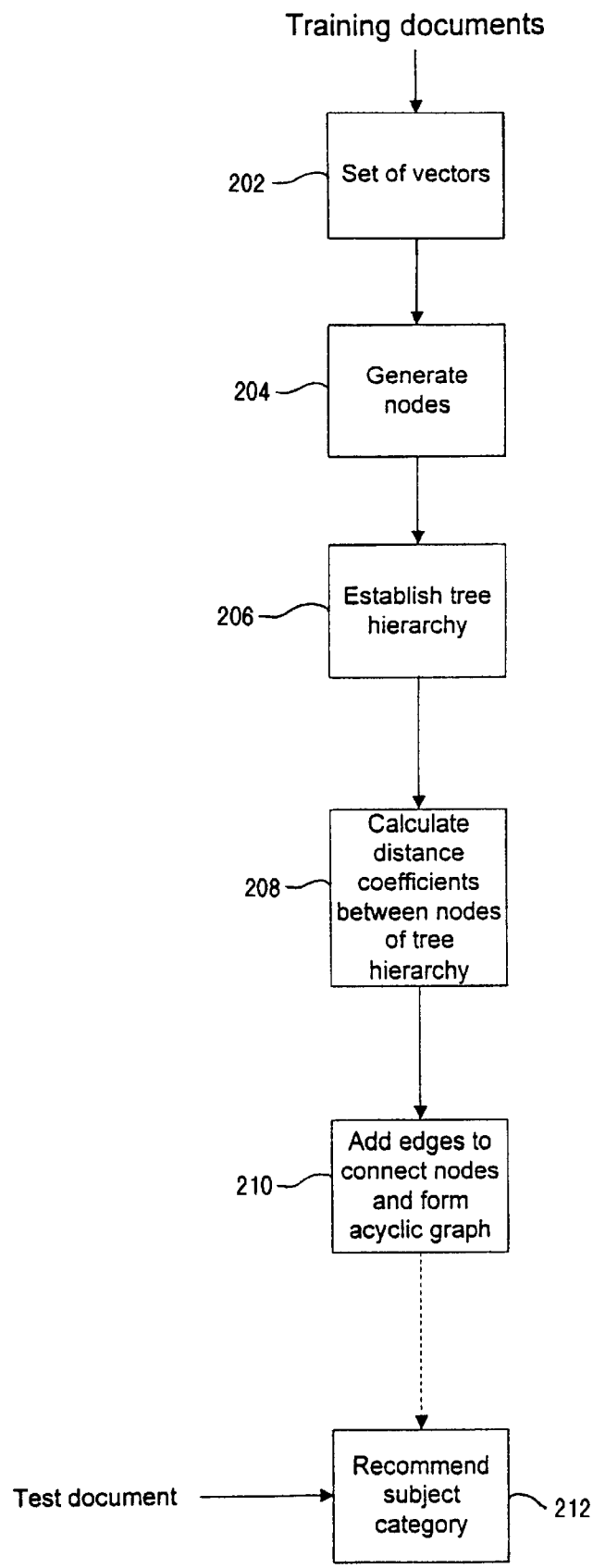
FIG. 2 is a flow diagram illustrating a recipe for generating a graph taxonomy and, optionally, for making content-based recommendations in accordance with an exemplary embodiment of the present invention.

FIG. 2 is a flow diagram illustrating an exemplary recipe for generating a graph taxonomy and, optionally, for making content-based recommendations in accordance with an embodiment of the present invention. A graph taxonomy may be used to preprocess and organize information in order to provide users quicker access to relevant documents or data objects. Information may be received as documents or data objects provided, for example, in electronic form. Information which is used generate a graph taxonomy may be referred to as a set of training documents.

Representing Documents with Vectors

Each document may be represented by a vector. The components of a vector, representing a document, may be weights. Each weight component of a vector may correspond to a term or word which may be found in a dictionary. The total number of components in each vector may equal the total number of words in a dictionary. Hence, if a dictionary is given by a set of words D, where the cardinality of D is $|D|=n$, then each vector representing a document is an n-tuple of weights. In step 202, a set of training documents (data) may be received (e.g. electronically) in the form of data objects and represented by a set of vectors of weights.

Each weight corresponding to a word in the dictionary indicates a "relative importance" of the word in the document. For example, a weight may be determined from a frequency of occurrence of a word in a document and a normalization factor for the word. Suppose, for example, there are six words in a dictionary (i.e. $|D|=6$). In particular, suppose that $D=\{A,B,C,D,E,F\}$. Let two exemplary documents be denoted by X and Y. Let document X include the word A with a frequency of 2, the word C with a frequency of 4, the word D with a frequency of 5, and the word F with a frequency of 3. Let document Y include the word B with a frequency of 3, D with a frequency of 7, and E with a frequency of 5. In this case, document X and document Y may be represented by the following six component vectors:

Document $X=\{2,0,4,5,0,3\}$

Document $Y=\{0,3,0,7,5,0\}$.

Note the example above is given for six-dimensional vectors, however, in a practical application there may be thousands of words in the dictionary D. Note further that if each vector has many components, then each vector may include a relatively small number of nonzero components (i.e. the vector may be "sparse"). Hence, a "sparse" data structure representation of documents may be utilized. Data structures representing documents may be formed, for example, by lists which include a set of words with corresponding weights.

Words appearing in documents with high frequency may be less indicative of the subject matter of a document than words appearing with a low frequency. For example, commonly used words such as "good", "high", or "place" may have a high frequency, but may be less indicative of the subject matter of a document as compared with more specific words such as "architects", "estate", or "rental". Thus, it may be desirable to normalize weights for words in a document. One approach to addressing the high frequency of commonly used terms is to assign greater weight to words which appear infrequently in a set of training documents. Such a normalization of weights may be accomplished using, for example, an Inverse Document Frequency (IDF). The IDF of a word may be determined by the inverse of the number of training documents in which the word appears. Thus, the IDF of a word appearing in many training documents will be low compared with the IDF of another word appearing in few training documents. A weight corresponding to the frequency of occurrence of a word in a document may be normalized by multiplying the weight by the IDF for the word.

In some application, however, it may not be desirable to perform such normalization. For example, non-structured collections of training documents such as Web Pages may contain misspelled words or non-standard terminology. It may not be desirable to assign undue weight to misspelled words or to non-standard terminology. Assigning greater weight to misspelled words or to non-standard terminology, for example, may worsen system performance.

Hereinafter the term frequency or weight of a word refers to an appropriately normalized frequency corresponding to a word in a document. Frequency or weight of a words refers herein interchangeably either to a relative frequency of a word in a document or to a function of the relative frequency. In other words, the present invention is not restricted to any particular normalization function. For a further discussion of normalization functions the reader is referred to Gerard Salton, and Michael J. McGill, Introduction to Modern Information Retrieval, McGraw-Hill Book Company, 1983.

Generating Nodes

In step 204 of FIG. 2 a set of no more than K nodes may be generated using clustering. Two types of clustering methodologies are agglomerative techniques and seed-based techniques.

Agglomerative techniques involve starting with one cluster for each vector. Neighboring clusters are combined at each step of the method until a relatively small set of clusters results. Each of the resulting set of clusters may include many vectors.

Seed-based techniques involve finding a set of seeds around which clusters may be constructed. The set of seeds forms a set of "anchor points" or "centroids" around which clusters may be constructed. For example, a seed may be a vector representing a document. Further, a seed may represent the information contained in the documents included in a cluster built around the seed.

A seed may be, for example, either a vector representing a document of the training documents or a function of vectors representing closely related documents. Once a proper set of seeds is obtained it may be possible to assign each of the vectors of a given set to a seed of a set of seeds thereby constructing a corresponding set of clusters.

Figure 3:
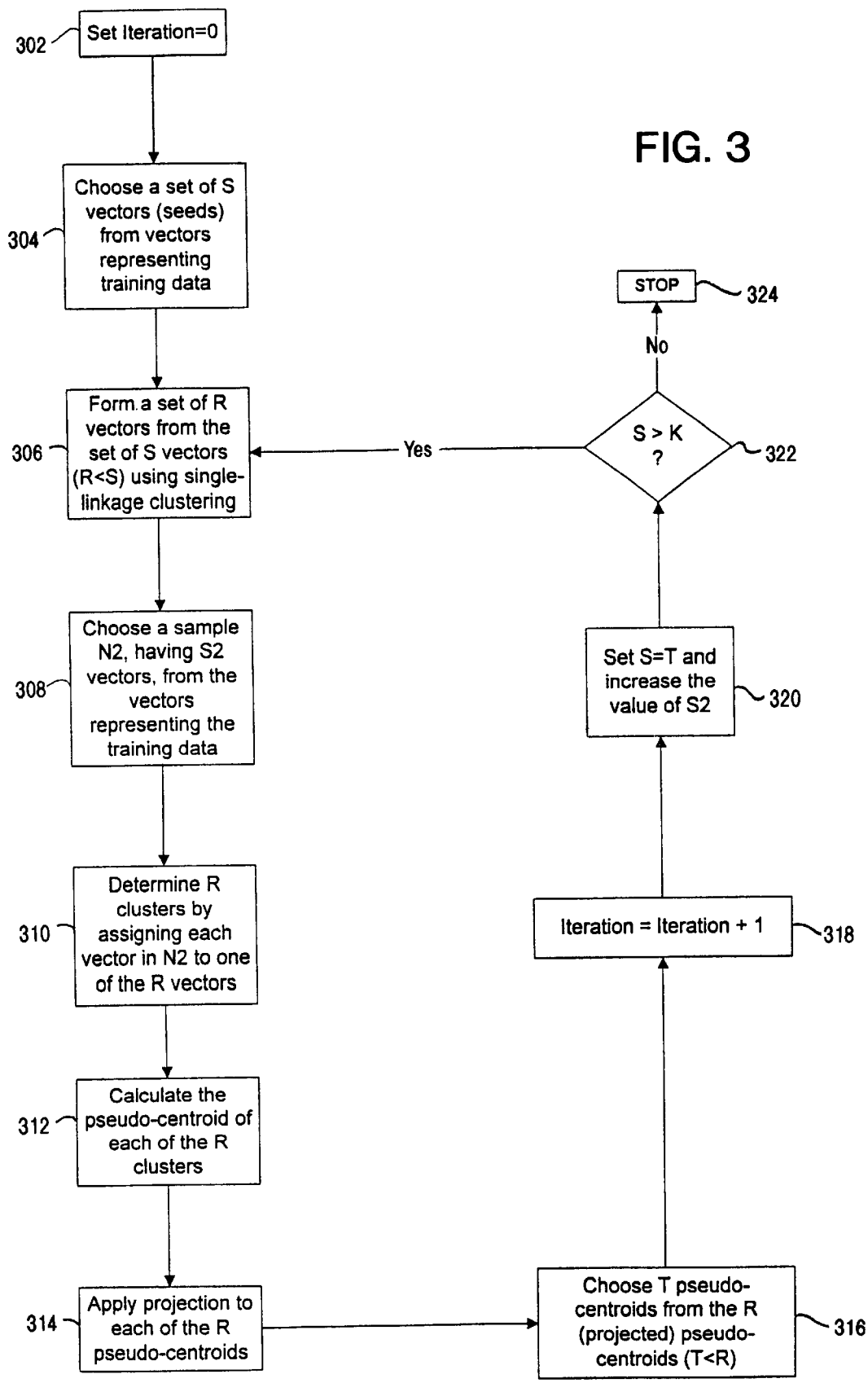
FIG. 3 is an exemplary projected-clustering method for generating a set of nodes from a set of vectors in accordance with an embodiment of the present invention.

In step 204 of FIG. 2 nodes may be generated using a projected-clustering method which draws on both agglomerative and seed-based techniques. FIG. 3 is an exemplary projected-clustering method for generating a set of no more than K nodes from a set of vectors. In step 302 a variable Iteration may be set to 0. The variable Iteration may be used to keep track of the number of repetitions of the method which have been performed. In step 304 a set of S vectors (seed vectors) may be chosen from the set of vectors representing a set of training documents. The value of S may be chosen based on system performance (e.g. quality of performance or running time). Further, the set of S vectors may be chosen, for example, randomly from the set of vectors representing the training documents.

In step 306 the set of S vectors (seeds) is reduced to a set of R vectors. The present invention is not restricted to any particular method of reducing the set of S vectors (seeds) to a set of R vectors. One option is to apply a single-linkage clustering procedure to reduce the set of S vectors to a set of R vectors. For example, the procedure given in FIG. 4 may be applied. In step 402 a single-linkage clustering procedure may be applied to create R clusters from the set of S vectors (seeds). For a discussing of single-linkage clustering procedures, see for example, Sibson R., 'SLINK: An optimally efficient algorithm for the single-link cluster method', The Computer Journal, Vol. 16, No. 1, pp. 30–34, February 1973, British Computer Society, incorporated by reference in its entirety herein.

In step 404 the centroid of each of the R clusters created in step 402 may be calculated. In this context, a centroid may be defined for a set of vectors belonging to a cluster. The centroid represents a meta-document obtained by concatenating (or appending) a set of documents. For example let C represent a cluster of vectors, and suppose that $C=\{v_1,v_2, \ldots, v_m\}$. Let the vectors $\{v_1,v_2, \ldots, v_m\}$ belonging to the cluster C represent a set of documents, say $\{d_1,d_2, \ldots, d_m\}$. The centroid $v_c$ of the cluster C may be obtained by the (vector) sum $v_1+v_2+ \ldots +v_m$. Thus, the centroid $v_c$ represents a meta-document obtained by concatenating (or appending) the documents $d_1,d_2, \ldots, d_m$. Hence, for the aforementioned example in which X=(2,0,4,5,0,3) and Y=(0,3,0,7,5,0) the centroid of $\{X,Y\}$ may be given by X+Y=(2,3,4,12,5,3). In step 406 the R centroids corresponding to the R clusters created in step 402 are reported.

Note that the value R may be chosen as a function of S and/or the variable Iteration. For example, for each iteration of the method of FIG. 3 the value of R may be set to S/2. Alternatively, the value of R may be set to $S*\text{Iteration}/(\text{Iteration}+1)$.

The present invention is not restricted by any particular function reducing the value of S to R. It is also understood that as S and R are integers, values such as S/2 or S*Iteration/(Iteration+1) may be rounded up or down to the nearest integer.

In step 308 of FIG. 3 a set having S2 vectors, denoted N2, may be chosen from the vectors representing the training documents. The set N2 may be chosen at random. A random number generator may be used in order to decide whether or not a vector is to be included in the set N2. For a discussion of random number generators, see, for example, Press W. H., Teukolsky S. A., Vetterling W. T., and Flannery B. P., Numerical Recipes in C, Second Edition, Cambridge University Press, pp. 274–284. Choosing a subset N2 of the entire set of vectors representing the training data may improve the running time of the method executing in a computer. Note, however, that optionally the set N2 may be chosen to be the entire set of vectors representing the training data.

In step 310 a partition of the set N2 is created by assigning each of the vectors belonging to N2 to one of the R centroids produced in step 306. Hence, an R-partition or R clusters are generated. Each vector may be assigned to the closest centroid based on a distance measure or coefficient. In other words, the distance between a vector and each of the centroids may be calculated, and the vector may be assigned to the nearest centroid. Various distance or similarity measures may be used in order to calculated the distance between two vectors (e.g. between a vector and a centroid). For a discussion of similarity measures, see, for example, William B. Frakes, and Ricardo Baeza-Yates, Information Retrieval: Data Structures and Algorithms, Prentice Hall, PTR, Upper Saddle River, N.J., 1992, incorporated by reference in its entirety herein. The present invention is not restricted to any particular measure of distance between two vectors.

For example, a cosine coefficient may be used as a similarity measure. For two vectors $v_1$ and $v_2$ the cosine coefficient may be defined (by analogy to the cosine function) as the dot product of the two vectors $v_1$ and $v_2$ divided by the product of the magnitudes of $v_1$ and $v_2$. Namely, $$\text{Cosine-coeff}(v_1, v_2) = \frac{v_1 \cdot v_2}{\|v_1\| \cdot \|v_2\|}$$

Where $\|\cdot\|$ denotes a vector norm (e.g. a Euclidean norm). For instance, if X=(2,0,4,5,0,3) and Y=(0,3,0,7,5,0), then X·Y= 35, $\|X\|^2$=54 and $\|Y\|^2$=83, and Cosine-coeff(X,Y) ≈0.5228. Note that the cosine coefficient varies between 0 and 1. Note further that the value of the cosine coefficient of two vectors representing two documents may increase with the number of words the two documents have in common. In other words, the cosine coefficient may be used to indicated the degree of similarity (or distance) between two vectors and between the two documents represented by the vectors.

In step 312 the pseudo-centroid of each of the R clusters determined in step 310 is calculated. A pseudo-centroid is calculated by applying a damping function to each of a set of vectors of a cluster, and then calculating the (vector) sum. For example, consider, as in the foregoing, a cluster C={$v_1$, $v_2$, ..., $v_m$}. A damping function is a function which is applied to all the component frequencies of a vector. A damping function may be used, for example, in order to reduce a skew in frequency distribution. A damping function may be, for example, a square-root or a logarithmic function. Let $v_1$=($v_{11}$, $v_{12}$, ..., $v_{1n}$) then a damping function applied to $v_1$, say $f_{damp}(v_1)$, may define the n-vector ($f_{damp}(v_{11})$, $f_{damp}(v_{12})$, ..., $f_{damp}(v_{1n})$). For example, a vector X=(2,0, 4,5,0,3), the a square-root damping function $\sqrt{X}$ defines the vector ($\sqrt{2}$,0,2,$\sqrt{5}$,0,$\sqrt{3}$). Hence, the pseudo-centroid $v_{pseudo}$ of cluster C may be given by the (vector) sum $$v_{pseudo} = \sum_{i=1}^{m} f_{damp}(v_i)$$

for a given damping function $f_{damp}$. For a further discussion of damping functions the reader is referred to Gerard Salton, and Michael J. McGill, Supra. Note that, as in the case of a centroid, a pseudo-centroid may represent a meta-document. For example, $v_{pseudo}$ may represent the meta-document formed by concatenating the m documents represented by the vectors belonging to cluster C.

In step 314 a projection method may be applied to the R pseudo-centroids calculated in step 312. Each of the R pseudo-centroids calculated in step 312 may contain a large number of nonzero component values (i.e. the number of words represented by each pseudo-centroid may be relatively large). It may be desirable to reduce the number of nonzero component values (of the pseudo-centroids) in order to focus attention on a smaller number of words in a meta-document. Reducing the number of nonzero component values, by setting components with relatively low weight to zero, is referred to herein as performing a projection. There are various approaches to performing projections. For example, setting to zero all components with weights which are less than a threshold percentage of the total weight associated with the meta-document (i.e. for a vector ($z_1$,$z_2$, ..., $z_n$) representing a meta-document, set $z_i$ to zero if $$z_i \bigg/ \sum_{j=1}^{n} z_j < \text{the threshold}).$$

Optionally, a predetermined number of components may be set to zero by retaining only the largest weights (e.g. suppose three components are to be retained from the six-vector 1.414, 1.732, 2, 4.892, 2.236, 1.732) may after projection yield (0, 0, 2, 4,892, 2.236, 0)).

FIG. 5 illustrates an exemplary procedure for performing a projection in accordance with an embodiment of the present invention. Suppose that each of the R pseudo-centroids calculated in step 312 is an n-vector. In step 502 the p (p<n) largest component weights may be identified for each of the R pseudo-centroids. In step 504 the smallest (n-p) component weights of each of the R pseudo-centroids may be set to zero. Thus, in step 506 R projected pseudo-centroids, each having at least (n-p) zero components, may be reported.

In step 316 T pseudo-centroids may be chosen from the R (projected) pseudo-centroids found in step 314. T pseudo-centroids may be chosen from the R (projected) pseudo-centroids in order to sufficiently reduce the number of pseudo-centroids produced by performing steps 306, 308, 310, 312, 314, 316, 318, 320 and 322. For example, the T pseudo-centroids corresponding to meta-documents which were formed from concatenating the largest number of documents may be chosen. In other words, the T pseudo-centroids corresponding to T of the R clusters (determined in step 310) which include the largest number of documents may be chosen. Alternatively, the T pseudo-centroids corresponding to meta-documents with the largest number of words may be chosen. It may be desirable to choose a larger fraction of the R (projected) pseudo-centroids for larger values of the variable Iteration. In other words, it may be desirable to discard more of the R pseudo-centroids in one repetition of steps 306, 308, 310, 312, 314, 316, 318, 320 and 322 than in the following repetition of steps 306, 308, 310, 312, 314, 316, 318, and 320. Therefore, The value T (i.e. the number of pseudo-centroids chosen) may be a function of the value R and/or of the variable Iteration. For example, the value for T may be selected to be T=R*Iteration/(Iteration+1). Alternatively, a constant fraction of the R (projected) pseudo-centroids may be chosen. For example, T=0.9*R.

In step 318 the value of the variable Iteration may be incremented. In step 320 the variable S may be reset to the value T (i.e. the number of pseudo-centroids chosen in step 316. Further, in step 320 the value of S2 may be reset. It may be desirable to increase the value of S2. Increasing the value of S2 increases the portion of the training data which is chosen in step 308. The value of S2 may be increased in step 320 based on the current value of S2 and/or the variable Iteration. For example, the value of S2 may be doubled in step 320, i.e. S2 may be reset to 2*S2, or S2 may be set to S2*Iteration/(Iteration+1). Increasing the size of the set chosen in step 308 may be helpful in improving the accuracy of computation with each iteration. It may also be desirable to choose methods for calculating the value of R in step 306, and the value of S2 in step 320, respectively, such that the product of R and S2 is substantially constant from iteration to iteration. Maintaining the product R*S2 substantially constant from iteration to iteration may help to ensure the running time of step 310 remains substantially constant from iteration to iteration. Maintaining the product R*S2 substantially constant from iteration to iteration may further provide a rule of thumb for achieving a good tradeoff between running time and accuracy of computation.

In step 322 a determination is made whether a set of K pseudo-centroids have been found or whether steps 306, 308, 310, 312, 314, 316, 318, and 320 may be repeated. If in step 322 it is determined that S≦K, i.e. no more than K pseudo-centroids have been found, then in step 324 the projected-clustering method may terminate. If in step 322 it is determined that S>K, then steps 306, 308, 310, 312, 314, 316, 318, and 320 may be repeated to reduce further the number of pseudo-centroids.

Each of the (no more than K) pseudo-centroids found by performing the recipe of FIG. 3 may be identified (associated) with a node. Therefore, the method of FIG. 3 may be used to generate nodes.

Establishing a Tree Hierarchy

In step 206 of FIG. 2 a tree hierarchy may be established based on nodes generated in step 204. Suppose, without loss of generality, that K nodes are generated in step 204 of FIG. 2. A tree hierarchy may be established using the K nodes generated in step 204 as leaf nodes.

Figure 6:
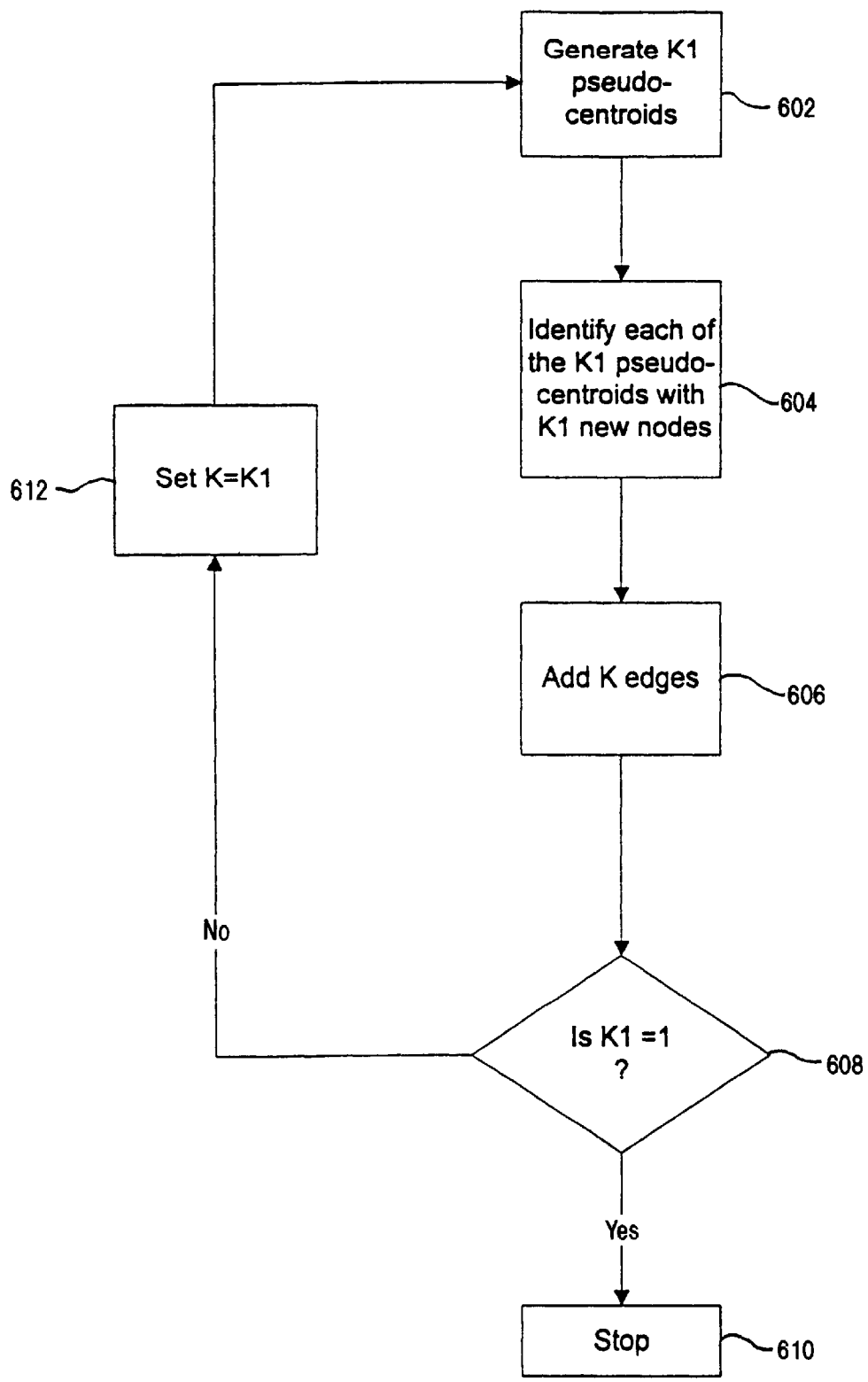
FIG. 6 illustrates a recipe for established a tree hierarchy, having average degree M, based on K leaf nodes in accordance with an embodiment of the present invention.

FIG. 6 illustrates a recipe for established a tree hierarchy, having average degree M, based on K leaf nodes. Let the notation [K/M] denote an integer obtained by rounding up the floating point value of K/M. In step 602 (no more than) [K/M] pseudo-centroids may be generated from the K pseudo-centroids identified with the K leaf nodes. Step 602 may be performed by initializing the set of S vectors (seeds) to be K pseudo-centroids identified with K leaf nodes and by repeating steps 306, 308, 310, 312, 314, 316, 318, 320, 322, and 324 of FIG. 3. Suppose, without loss of generality that K1 pseudo-centroids are generated in step 602. In step 604, K1 new nodes may be identified the K1 pseudo-centroids generated in step 602.

The K1 nodes generated in step 604 may now be used to form the next (higher) level of a tree hierarchy having the K leaf nodes generated in step 204 of FIG. 2. In step 606 K edges may be added from the K1 (new) nodes generated in step 604 to the K leaf nodes generated in step 204 of FIG. 2. Edges may be added based on a distance measure between higher level pseudo-centroids (identified with higher level nodes) and lower level pseudo-centroids (identified with lower level nodes. For example, let $c_1$ be a pseudo-centroid identified with one of the K nodes generated in step 204. An edge may be added entering the node identified with c1 and exiting a node identified with the nearest (based on the distance measure) of the K1 pseudo-centroids generated in step 602. In other words, and edge is added indicating that the node identified with $c_1$ is a child node of a (parent) node identified with the nearest (based on the distance measure) of the K1 pseudo-centroids generated in step 602.

In step 608 a determination may be made whether K1=1. If it is determined in step 608 that K1≠1, then in step 612 the value K is reset to K1. If K1≠1 the process 602, 604, 606, 608, 610, and 612 may be repeated recursively using the new K1 nodes in place of the K nodes of a previous recursive step. If it is determined in step 608 that K1=1, then the process may terminate in step 610. K1=1 indicates a root node has been generated and, hence, a tree hierarchy taxonomy has been established.

Note that in addition to identifying a node each pseudo-centroid may also identify a cluster of vectors associated with a node. For example, a vector may be assigned to a node (or a cluster associated with a node) if a distance measure between the vector and the pseudo-centroid identifying the node is smaller than the distance between the vector and any other pseudo-centroid identifying any other node.

Forming Acyclic Graph

Figure 7:
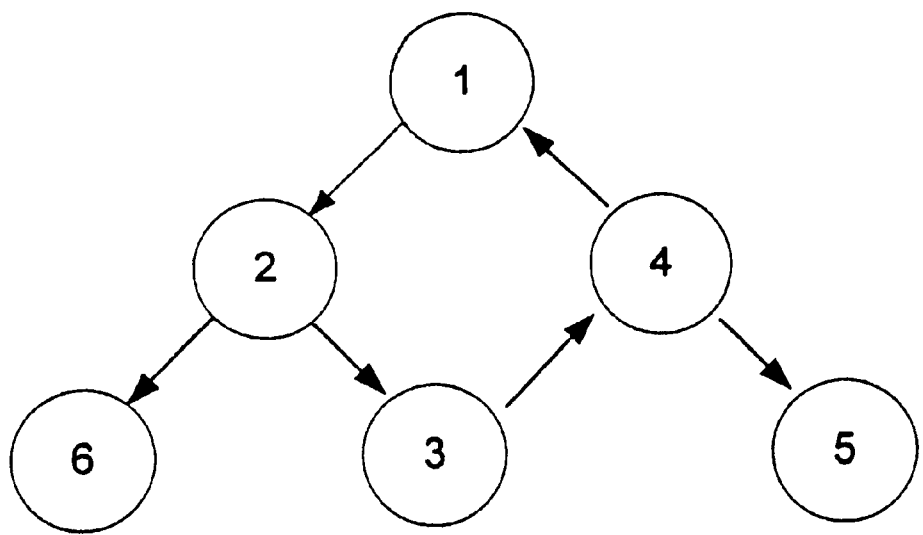
FIG. 7 illustrates an exemplary graph containing a cyclic path.

A graph includes a set of nodes and a set of edges, where nodes are connected by edges in accordance with a relation on the set of nodes. A directed graph is a graph in which edges are marked as exiting one node and entering another node (i.e. a directed graph represents a relation on nodes which is not necessarily symmetric). A graph is said to contain cycles if the graph includes a closed or cyclic path (i.e. a path with identical starting and ending node). FIG. 7 illustrates an exemplary graph containing the cyclic path 1→2→3→4→1. A graph which does not contain any cycles is referred to as an acyclic graph. A tree hierarchy is an instance of a directed acyclic graph.

Figure 8:
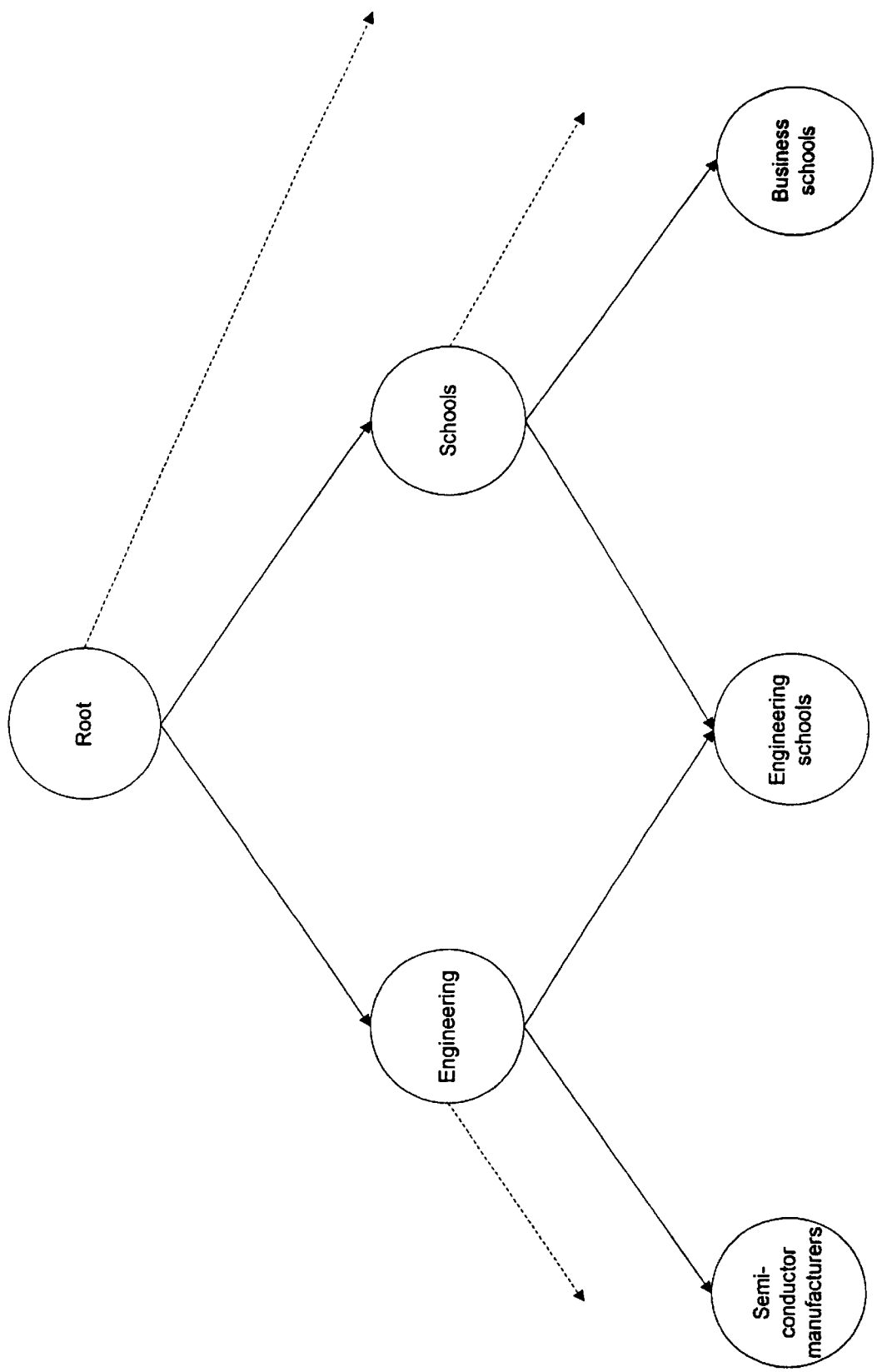
FIG. 8 illustrates an exemplary graph taxonomy which is more general than a tree taxonomy.

The class of directed acyclic graphs is not, however, restricted to tree hierarchies. FIG. 8 illustrates an exemplary graph taxonomy which is more general than a tree taxonomy. In FIG. 8 two exemplary subject categories, namely, "Engineering" and "Schools", label two nodes which are both connected by directed edges to a lower level node labeled "Engineering Schools". Thus, 'overlap' exists between the cluster associated with the node labeled "Engineering" and a cluster associated with the node labeled "Schools".

Generating graph taxonomies which express such 'overlap' of subject categories may provide flexibility helpful to building document taxonomies. For example, subject categories for Web Pages may include subject category 'overlap'. Using graph taxonomies may allow distinctions to be drawn between closely related subjects, such as, for example, "Architectural examples" and Architects". Therefore, it may be desirable to add edges to tree hierarchies in order to created more general graph taxonomies. Note that for an acyclic graph one node is defined to have a higher level than another node, if a path leading from the root node to the one node has fewer edges than the edges of a path leading from the root node to the other node.

In step 208 of FIG. 2 distance coefficients may be calculated between nodes of a tree hierarchy established in step 206. A distance between two nodes may be calculated as a distance or similarity measure between two vectors as discussed in the foregoing. In particular, the distance between two nodes may be computed as the similarity measure between two pseudo-centroids identified with the nodes. For example, the distance between a node P1 and a node P1 may be calculated by the cosine coefficient of $c_{P1}$, the pseudo-centroid identified with P1, and $C_{P2}$, the pseudo-centroid identified with P2, (i.e. Cosine-coeff($c_{P1}, c_{P2}$)). Based on the distances between nodes calculated in step 208, directed edges may be added to a tree hierarchy in step 210 to obtain an acyclic graph. The acyclic graph obtained in step 210 may be, for example, stored as a data structure in a data memory.

Figure 9:
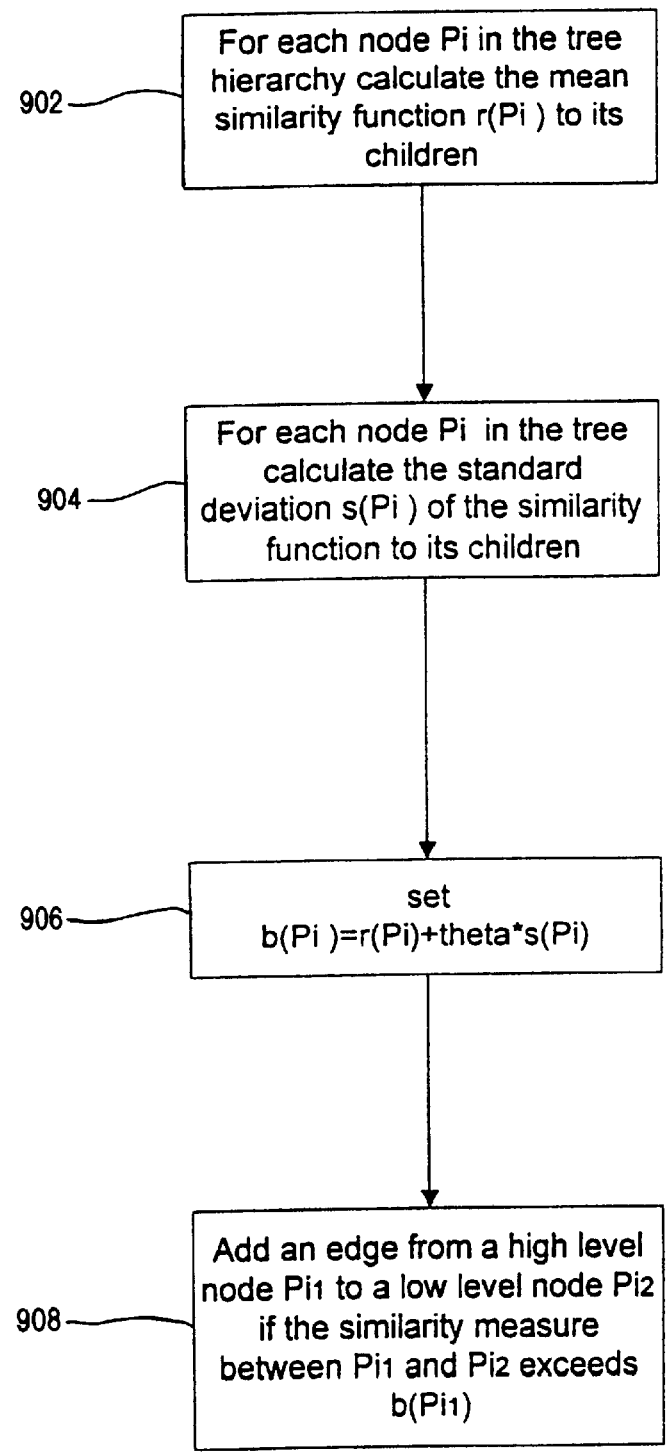
FIG. 9 illustrates an exemplary method for adding edges to a tree hierarchy based on distances between nodes in accordance with an embodiment of the present invention.

FIG. 9 illustrates an exemplary method for adding edges to a tree hierarchy based on distances between nodes. In step 902, for each node Pi in a tree hierarchy, a similarity measure or distance is computed to each of the child nodes of Pi. Further, in step 902, an average value denoted r(Pi) of distances, between a node Pi and each of its child nodes, may be computed. In step 904, a standard deviation s(Pi) of the set of distances from a node Pi to its child nodes, may be computed. In step 906 a threshold $$b(Pi) = r(Pi) + \text{theta} * s(Pi)$$

may be computed for each node Pi of a tree hierarchy, and for a predetermined constant 'theta'.

In step 908 edges are added between nodes of a tree hierarchy based on distances between nodes and the thresholds calculated in step 906. An edge may be added in step 908 exiting a higher level node $Pi_1$, and entering a lower level node $Pi_2$, if a similarity measure between $Pi_1$ and $Pi_2$ is greater than $b(Pi_1)$.

For example, suppose that $c_{i1}$ a pseudo-centroid identified with a higher level node $Pi_1$, and $c_{i2}$ is a pseudo-centroid identified with a lower level node $Pi_2$. Suppose further that the cosine coefficient is chosen a similarity measure. Then an edge may be added to a tree hierarchy established in step 206 of FIG. 2 if $$\text{Cosine-coeff}(c_{i1}, c_{i2}) \geq b(Pi_1) = r(Pi_1) + \text{theta} * s(Pi_1).$$

Once a graph taxonomy has been generated by adding edges to a tree hierarchy subject labels may be added to each node. For example, subject labels may be added to nodes manually. Alternatively, subject labels may be added automatically using words corresponding to non-zero weight components of pseudo-centroids identifying nodes. Labels may be added, for example, as part of a data structure used to store a graph taxonomy in a computer data memory. Further, as each node may be associated with a cluster of vectors, subject labels for nodes may also serve to label an associated cluster.

Content-based Recommendations

The process of finding the closest matching subject area or category to a given test document is referred to as 'making content-based recommendations'. A test document may be, for example, a collection of keywords provided by a user. Note that hereinafter, for the sake of ease of exposition, a formal distinction will not be drawn between a node and an underlying vector or pseudo-centroid identifying the node (e.g. a distance between two nodes shall be interpreted as a distance between the two vectors identifying the nodes). Optionally, in step 212 of FIG. 2 content-based recommendations may be made. The inventors have found that the techniques disclosed herein lead to an increased capability for distinguishing between closely related subject categories in a graph taxonomy and, hence, to better recommendations.

Figure 10:
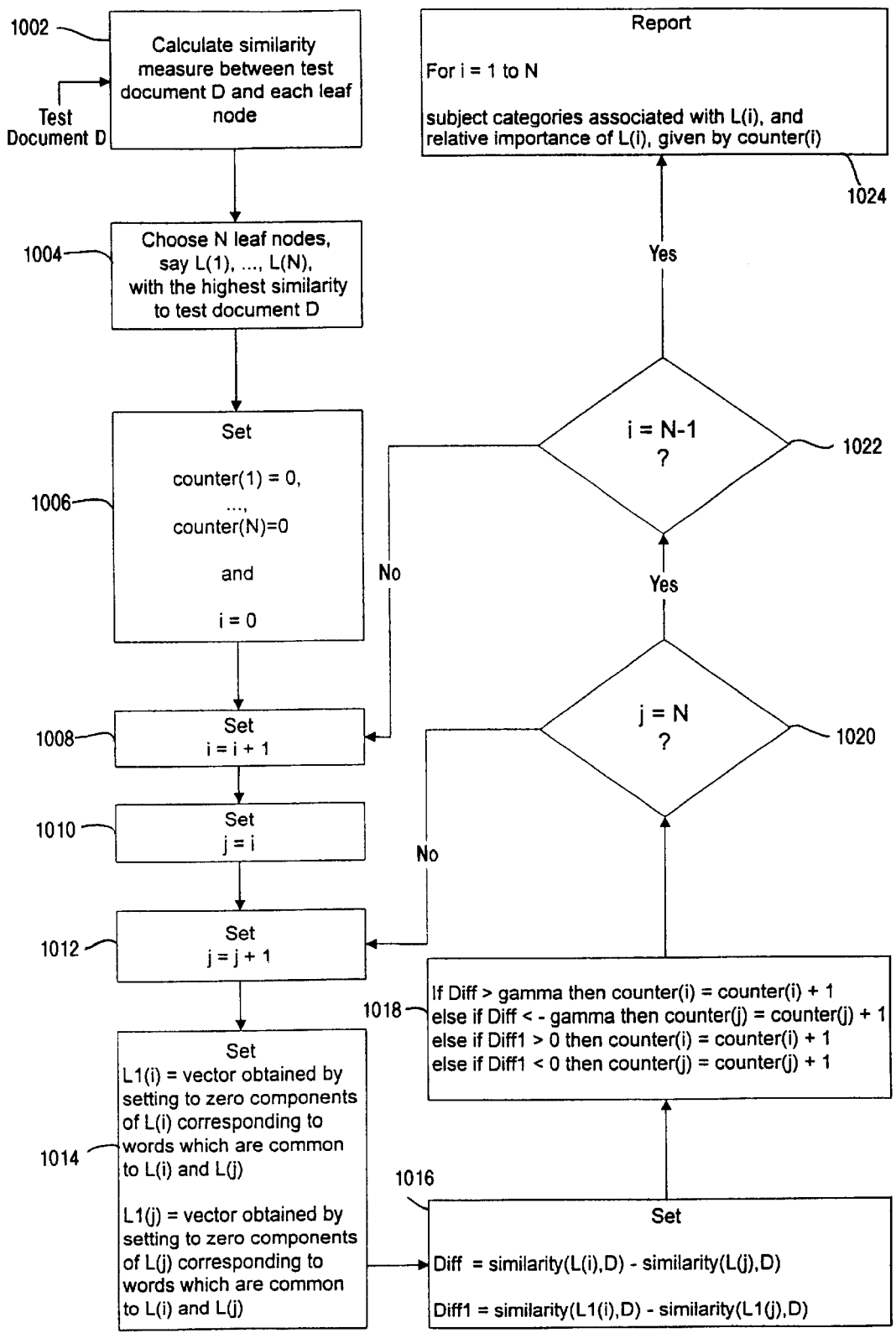
FIG. 10 illustrates a method for making content-based recommendations for a test document based on leaf level nodes in accordance with an exemplary embodiment of the present invention.

FIG. 10 illustrates a method for recommending to a user N subject categories which are labels of leaf nodes of a graph taxonomy generated as described in the foregoing. Further, the N subject categories recommended to a user may be ranked by relative importance. In step 1002 a similarity measure (e.g. a cosine coefficient) may be calculated between a test document D and each of a set of leaf nodes of a graph taxonomy. The test document may, for example, be provided by a user. Based on the result of step 1002, N leaf nodes, say L(1), . . . , L(N), may be chosen in step 1004. The nodes chosen in step 1004 may be the N leaf nodes bearing the highest similarity (having the shortest distance) to test document D. In steps 1006, 1008, 1010, 1012, 1014, 1016, 1018, 1020, 1022 the relative importance of the recommended subject categories which label nodes L(1), . . . , L(N) may be determined. In other words, recommended subject categories, which label nodes L(1), . . . , L(N) may be ranked according their relative importance.

In step 1006 an array of variables counter(1), . . . , counter(N) may be initialized to 0, and a variable i may also be initialized to 0. At the completion of the (sub-) method of steps 1006, 1008, 1010, 1012, 1014, 1016, 1018, 1020, 1022 each variable counter(i) may indicate, respectively, a relative importance or rank of a recommended subject category labeling node L(i).

In step 1008 variable i may be incremented. In step 1010 a variable j may be set to i. In step 1012 the counter j may be incremented. Thus, steps 1008, 1010, 1012, 1014, 1016, 1018, 1020, 1022 form a nested loop. In step 1014 a vector L1(i) may be obtained by setting to zero any component(s) of vector L(i) which correspond(s) to words which are common to both L(i) and L(j). In other words, Ll(i) may be obtained by removing (zero-ing) non-zero weight components of L(i) corresponding to non-zero components of L(j). For example, if L(i) is identified with (9,1,0,3,4,5,7) and L(j) is identified with (2,0,0,0,1,1,0), then L1(i) may be set to (0,1,0,3,0,0,7). Further, in step 1014, a vector L1(j) may be obtained by setting to zero any component(s) of vector L(j) which correspond(s) to words which are common to both L(i) and L(j). In step 1016 the value of a variable Diff may be calculated by taking the difference between a distance between L(i) and D, and a distance between L(j) and D. Hence, $$\text{Diff} = \text{similarity}(L(i), D) - \text{similarity}(L(j), D),$$

where the notation similarity(·,·) denotes a similarity or distance measure, such as, for example, a cosine coefficient. The value of a variable Diff1 may also be calculated in step 1016 by taking the difference between a distance between L1(i) and D, and a distance between L1(j) and D. Hence, $$\text{Diff1} = \text{Similarity}(L1(i), D) - \text{Similarity}(L1(j), D),$$

where the notation Similarity(·,·) denotes a similarity or distance measure, such as, for example, a cosine coefficient.

In step 1018, if the value of the variable Diff is greater than a predetermined (non-negative) parameter gamma, then the value of the variable counter(i) may be incremented. Otherwise, if the value of the variable Diff is not greater than parameter gamma, then if the value of the variable Diff is less than −gamma, then the value of the variable counter(j) may be incremented. If, however, $$-\text{gamma} \leq \text{Diff} \leq \text{gamma}$$

then the value of the variable counter(i) may be incremented if the value of the variable Diff1 is positive, and the value of the variable counter(j) may be incremented if the value of the variable Diff1 is negative. Note that the use of the variable Diff1 in addition to the variable Diff may be advantageous in that the elimination of considerations of common words in the calculation of Diff1 may lead to improved distinctions between related subject categories.

In step 1020 a determination may be made whether an inner loop in the variable j, ranging in value from (i+1) to N, has finished. If the loop in the variable j has not yet terminated, the method proceeds to step 1012. If the loop in the variable j has finished then in step 1022 a determination may be made whether an outer loop in the variable i, ranging in value from 1 to N−1, has finished. If the loop in the variable i has not yet terminated, the method proceeds to step 1008. If the loop in the variable i has finished then in step 1024 recommended subject categories and their corresponding relative importance may be reported to a user.

In step 1024 subject categories given by the labels of nodes L(1), . . . , L(N) may be recommended to a user. In addition, in step 1024 the relative importance or rank of a subject category may also be reported to a user, where the relative importance of a subject category labeling a node L(i), i=1, ..., N, may be given by the value of the variable counter(i), i=1, ..., N. Optionally, subject categories given to a user may be sorted according to the value of the variables counter(i), i=1, ..., N. Further, as each node may be associated with a cluster of vectors, subject categories recommended to a user may be linked (e.g. by a hyperlink in a Web page) to a list of documents (or a list of hyperlinks to documents) related to the subject category.

Figure 11:
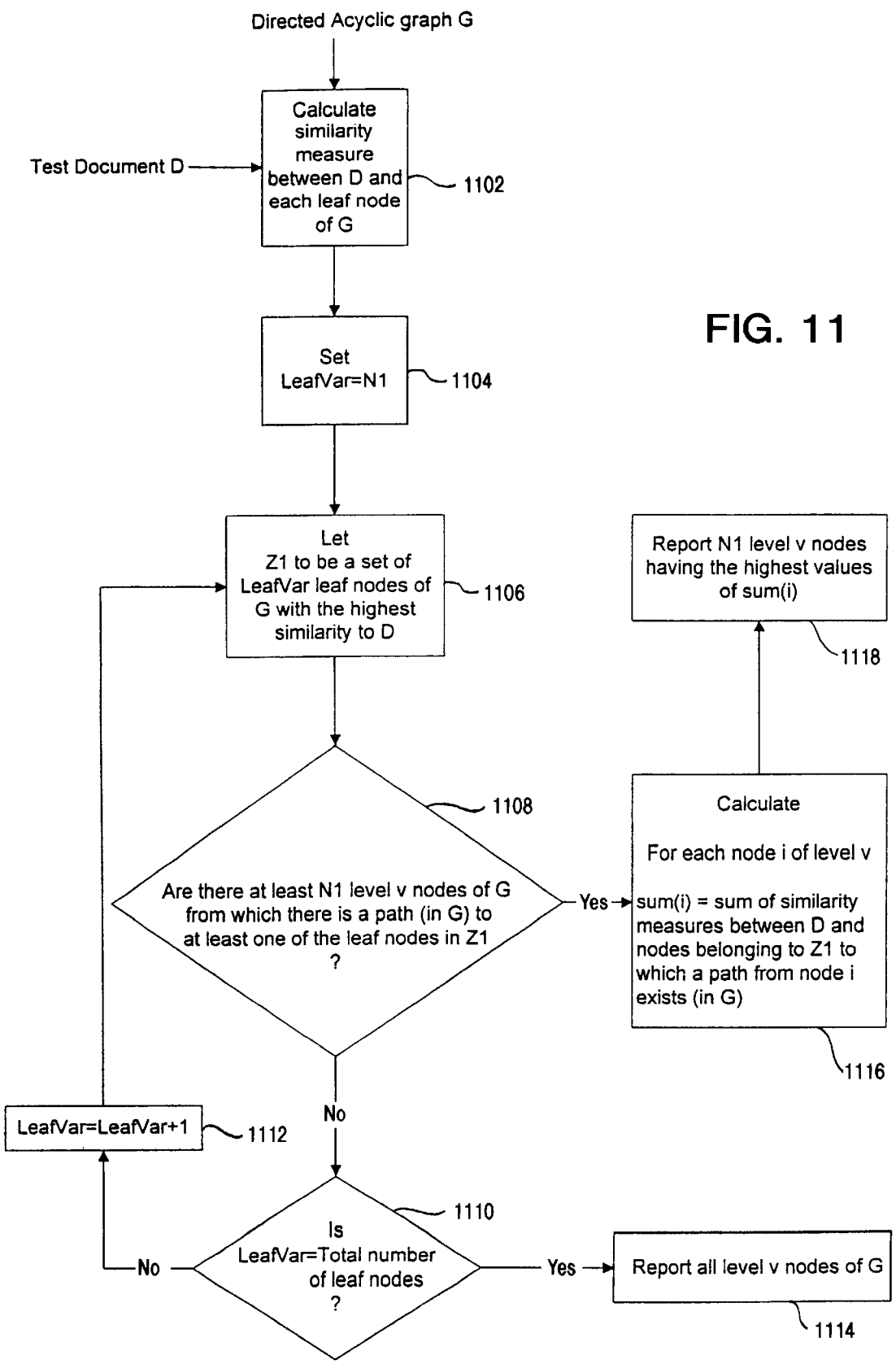
FIG. 11 illustrates a for making content-based recommendations for a test document in accordance with an exemplary embodiment of the present invention.

FIG. 11 illustrates a method for recommending to a user N1 subject categories which are labels of level v nodes. The level v of nodes in a graph may be, for example, specified by an integer provided by a user. In step 1102 similarity measures between a test document D and each leaf level node of an acyclic directed graph G may be calculated. In step 1104 a variable LeafVar may be set to N1. The value of N1 may be chosen, for example, by a user. N1 is assumed to be a positive integer which is less than the total number of leaf nodes of directed graph G. If N1 is given by a user to be greater than the total number of leaf nodes of directed graph G, N1 may be, for example, reset to an integer equaling the total number of leaf nodes of directed graph G.

In step 1106 LeafVar many leaf nodes of directed graph G having the highest similarity to test document D may be denoted by a set Z1 (i.e. $Z1=\{z_{11}, \ldots, z_{1LeafVar}\}$). Let the set of all level v nodes of graph G be denoted by Zv. In step 1108 a determination may be made whether the cardinality of the set $\{\tilde{z} \in Zv: \exists$ a path in G from $\tilde{z}$ to any leaf node belonging to Z1$\}$ is at least N1. In other words, in step 1108 a determination may be made whether there are at least N1 many level v nodes of directed graph G from which there is path, in graph G, to at least one of the leaf nodes belonging to the set Z1.

If at least N1 level v nodes are not found in step 1108, then a determination is made in step 1110 whether the value of the variable LeafVar is equal to the total number of leaf nodes of directed graph G. If LeafVar=the total number of leaf nodes of directed graph G, then in step 1114 subject categories given by the labels of all the level v nodes of directed graph G may be recommended to a user. If it is determined in step 1110 that LeafVar≠ the total number of leaf nodes of directed graph G, then the value of the variable LeafVar may be incremented in step 1112. Once LeafVar is incremented in step 1112, the method may proceed with step 1106.

If in step 1108 it is determined that there are at least N1 many level v nodes of directed graph G from which there is path, in graph G, to at least one of the leaf nodes belonging to the set Z1, then for each node i of these level v nodes found in step 1108, the value of a variable sum(i) may be calculated as follows:

let $Z1(i)=\{z \in Z1: \exists$ a path in G from node i to z$\}$, $$sum(i) = \sum_{z \in Z1(i)} Similarity(D, \tilde{z}),$$

where the notation Similarity(·,·) denotes a similarity or distance measure, such as, for example, a cosine coefficient.

In step 1118 subject categories given by the labels of the N1 level v nodes of directed graph G corresponding to the highest N1 values of the variables sum(i) may be recommended to a user. Optionally, subject categories given to a user may be sorted according to the value of the variables sum(i). Further, as each node may be associated with a cluster of vectors, subject categories recommended to a user may be linked (e.g. by a hyperlink in a Web page) to a list of documents (or a list of hyperlinks to documents) related to the subject category.

Exemplary Computer Apparatus

Figure 12:
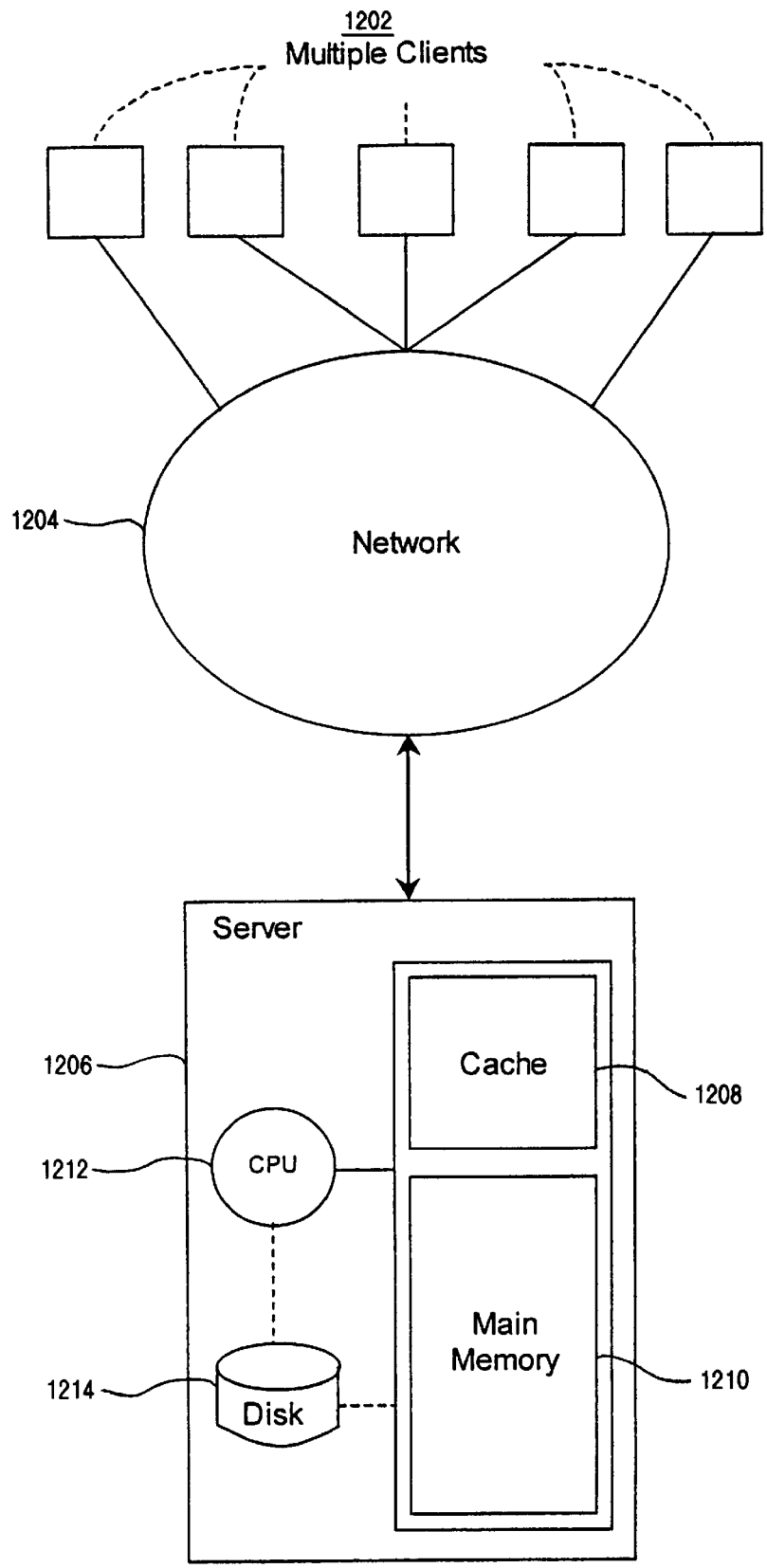
FIG. 12 is a block diagram of an apparatus for generating graph taxonomies and/or to making content-based recommendations in a computer and/or over a computer network in accordance with an exemplary embodiment of the present invention.

FIG. 12 is a block diagram of an apparatus for generating graph taxonomies and/or to making content-based recommendations in a computer and/or over a computer network. In the embodiment depicted in FIG. 12, multiple client computers 1202 may access a server 1206, for example a Web server, over a network 1204. Server 1206 may have a memory 1210 as well as a cache 1208. The server may further include a Central Processing Unit (CPU) 1212 for processing information, and a disk 1214 for storing data. Training documents and/or test documents may be collected from client computers 1202 by server 1206 over network 1204. Clients 1202 may also query server 1206 regarding the information stored in data memory 1210 and disk 1214. In particular, a client computer may query server 1206 for a content-based recommendation (e.g. subject categories provided as World Wide Web hyperlinks) relating to a test document. Server 1206 may generate a graph taxonomy based on the information stored in a database on disk 1214 and in memory 1210. Server 1206 may report recommended subject categories related to the test document to a client computer.

Although illustrated and described herein with reference to certain exemplary embodiments, the present invention is nevertheless not intended to be limited to the details shown. Rather, various modifications may be made in the details within the scope and range of equivalents of the claims and without departing from the spirit of the invention.

What is claimed:

1. A method of generating a graph taxonomy of information which is represented by a plurality of vectors, the graph taxonomy including a plurality of nodes and a plurality of edges, said method comprising the steps of:

(a) receiving the information represented by the plurality of vectors in the form of a plurality of data objects;

(b) generating the plurality of nodes, each node of the plurality of nodes associated with ones of the plurality of vectors;

(c) establishing a tree hierarchy in a data memory based on the plurality of nodes;

(d) calculating a plurality of distances between ones of the plurality of nodes; and (e) connecting ones of the plurality of nodes with other ones of the plurality of nodes by ones of the plurality of edges based on the plurality of distances to obtain the graph taxonomy, wherein the plurality of distances are respectively computed using the plurality of vectors associated with the plurality of nodes.

2. The method of generating the graph taxonomy of claim 1, wherein each of the plurality vectors includes a plurality of word frequencies corresponding to one of a plurality documents, and each of the plurality of nodes corresponds to a respective one of a plurality subject categories.

3. The method of generating the graph taxonomy of claim 2, further comprising the steps of:

providing a test document; and recommending, to a user, ones of the plurality of subject categories based on an other plurality of distances between the test document and at least one of the plurality of nodes.

4. The method of generating the graph taxonomy of claim 1, wherein the step of generating the plurality of nodes, further comprises the steps of:

partitioning the plurality of vectors into a plurality of clusters;

calculating a pseudo-centroid for each of the plurality of clusters;

calculating a projected pseudo-centroid based on the pseudo-centroid; and associating the projected pseudo-centroid with one of the plurality of nodes.

5. The method of generating the graph taxonomy of claim 1, wherein the plurality of nodes includes a plurality of high level nodes and a plurality of low level nodes, and the step of generating the plurality of nodes further comprises the steps of:

generating the plurality of low level nodes;

generating the plurality of high level nodes based on the plurality of low level nodes; and connecting one of the plurality of low level nodes with one of the plurality of high level nodes by one of the plurality of edges.

6. The method of generating the graph taxonomy of claim 5, wherein the plurality of high level nodes includes a parent node which is connected to at least one child node of the plurality of low level nodes, and step (e) further comprises the steps of:

calculating a mean of at least one of the plurality of distances between the parent node and said at least one child node;

calculating a standard deviation of said at least one of the plurality of distances between the parent node and said at least one child node; and connecting the parent node with a node of the plurality of low level nodes based on the mean and the standard deviation.

7. The method of generating the graph taxonomy of claim 1, wherein the step of generating the plurality of nodes, further comprises the steps of:

partitioning the plurality of vectors into a plurality of clusters;

calculating a plurality of pseudo-centroids corresponding to the plurality of clusters;

calculating a plurality of projected pseudo-centroids based of the plurality of pseudo-centroids;

selecting at least one of the plurality of projected pseudo-centroids based on the number of vectors belonging to each of the plurality of cluster; and associating said at least one of the plurality of projected pseudo-centroids with at least one of the plurality of nodes.

8. The method of generating the graph taxonomy of claim 1, wherein the step of generating the plurality of nodes, further comprises the steps of:

(i) selecting the ones of the plurality of vectors;

(ii) partitioning the ones of the plurality of vectors into a plurality of clusters;

(iii) calculating a plurality of projected pseudo-centroids corresponding to the plurality of clusters;

(iv) selecting at least one of the plurality of projected pseudo-centroids; and (v) associating said at least one of the plurality of pseudo-centroids with at least one of the plurality of nodes.

9. The method of generating the graph taxonomy of claim 8, wherein steps (i) through (iv) are repeated.

10. The method of generating the graph taxonomy of claim 9, wherein the number of ones of the plurality of vectors selected is based on the number of repetitions performed of steps (i) through (iv).

11. The method of generating the graph taxonomy of claim 9, wherein the number of said at least one of the plurality of projected pseudo-centroids selected is based on the number of repetitions performed of steps (i) through (iv).

12. The method of generating the graph taxonomy of claim 8, further comprising the step of selecting a plurality of seeds from the plurality of vectors, wherein step (ii) is performed based on the plurality of seeds.

13. The method of generating the graph taxonomy of claim 12, wherein steps (i) through (iv) are repeated.

14. The method of generating the graph taxonomy of claim 13, wherein the number of seeds selected from the plurality of vectors is based on the number of repetitions performed of steps (i) through (iv).

15. The method of generating the graph taxonomy of claim 1, wherein the plurality of nodes includes a plurality of low level nodes and a plurality of high level nodes, and the step of establishing a tree hierarchy, further comprises the step of:

generating the plurality of high level nodes from the plurality of low level nodes.

16. The method of generating the graph taxonomy of claim 15, wherein the step of generating the plurality of high level nodes from the plurality of low level nodes, further comprises the steps of:

creating a plurality of meta-documents corresponding to the plurality of low level nodes; and generating the plurality of high level nodes based on the plurality of meta-documents.

17. The method of generating the graph taxonomy of claim 16, further comprising the steps of:

partitioning the plurality of vectors into a plurality of clusters based on the plurality of meta-documents;

calculating a pseudo-centroid for each of the plurality of clusters; and calculating a projected pseudo-centroid based on the pseudo-centroid.

18. The method of generating the graph taxonomy of claim 17, wherein the step of generating the plurality of high level nodes from the plurality of low level nodes, further comprises the step of associating the projected pseudo-centroids with one of the plurality of high level nodes.

19. The method of generating the graph taxonomy of claim 15, wherein the step of calculating a plurality of distances between ones of the plurality of nodes, further includes the step of calculating the plurality of distances between each of the plurality of nodes and any of the plurality of nodes.

20. The method of generating the graph taxonomy of claim 19, wherein the step of connecting ones of the plurality of nodes with other ones of the plurality of nodes by ones of the plurality of edges, further includes the step of connecting ones of the plurality of low level nodes with ones of the plurality of high level nodes by ones of the plurality of edges based on the plurality of distances.

21. The method of generating the graph taxonomy of claim 2, wherein the plurality of nodes includes a plurality of leaf nodes, further comprising the steps of:

providing a test document;

calculating an other plurality of distances between the plurality of leaf nodes and the test document;

selecting ones of the plurality of leaf nodes based on the other plurality of distances;

calculating a plurality of similarity measures between selected ones of the plurality of leaf nodes; and sorting the selected ones of the plurality of leaf nodes based on the plurality of similarity measures.

22. The method of generating the graph taxonomy of claim 21, wherein a first leaf node of the selected ones of the plurality of leaf nodes is associated with a first meta-document and a second leaf node of the selected ones of the plurality of leaf nodes is associated with a second meta-documents, the first and second meta-documents including the plurality of word frequencies, and the step of calculating a plurality of similarity measures between selected ones of the plurality of leaf nodes, further comprises the steps of:

setting to zero ones of the plurality of word frequencies included in the first meta-document if corresponding ones of the plurality of word frequencies are nonzero in the second meta-document; and setting to zero ones of the plurality of word frequencies included in the second meta-document if corresponding ones of the plurality of word frequencies are nonzero in the first meta-document.

23. The method of generating the graph taxonomy of claim 2, wherein the plurality of nodes includes a plurality of leaf nodes and a plurality of high level nodes, further comprising the steps of:

providing a test document;

calculating an other plurality of distances between the plurality of leaf nodes and the test document;

selecting ones of the plurality of leaf nodes based on the other plurality of distances; and recommending to a user ones of the plurality of subject categories corresponding to ones of the plurality of high level nodes from which there is path in the graph taxonomy to the selected ones of the plurality of leaf nodes.

24. The method of generating the graph taxonomy of claim 23, wherein the step of recommending to a user ones of the plurality of subject categories, further comprises the step of calculating a plurality of similarity measures between the test document and the selected one of the plurality of leaf nodes to which there is the path in the graph taxonomy to the ones of the plurality of high level nodes; and calculating a sum of ones of the plurality of similarity measures associated with one of the plurality of high level nodes.

25. An article of manufacture comprising a computer usable medium having computer readable program code means embodied therein for generating a graph taxonomy of information which is represented by a plurality of vectors, the graph taxonomy including a plurality of nodes and a plurality of edges, the computer readable program code means in said article of manufacture comprising computer readable program code means for causing a computer to effect:

(a) receiving the information represented by the plurality of vectors in the form of a plurality of data objects;

(b) generating the plurality of nodes, each node of the plurality of nodes associated with ones of the plurality of vectors;

(c) establishing a tree hierarchy in a data memory based on the plurality of nodes;

(d) calculating a plurality of distances between ones of the plurality of nodes; and (e) connecting ones of the plurality of nodes with other ones of the plurality of nodes by ones of the plurality of edges based on the plurality of distances to obtain the graph taxonomy, wherein the plurality of distances are respectively computed using the plurality of vectors associated with the plurality of nodes.

26. An article of manufacture as recited in claims 25, wherein each of the plurality vectors includes a plurality of word frequencies corresponding to one of a plurality documents, and each of the plurality of nodes corresponds to a respective one of a plurality subject categories.

27. An article of manufacture as recited in claims 26, the computer readable program code means in said article of manufacture further comprising computer readable program code means for causing a computer to effect:

providing a test document; and recommending, to a user, ones of the plurality of subject categories based on an other plurality of distances between the test document and at least one of the plurality of nodes.

28. A program storage device readable by machine, tangibly embodying a program of instructions executable by the machine to perform method steps for generating a graph taxonomy of information which is represented by a plurality of vectors, the graph taxonomy including a plurality of nodes and a plurality of edges, said method comprising the steps of:

(a) receiving the information represented by the plurality of vectors in the form of a plurality of data objects;

(b) generating the plurality of nodes, each node of the plurality of nodes associated with ones of the plurality of vectors;

(c) establishing a tree hierarchy in a data memory based on the plurality of nodes;

(d) calculating a plurality of distances between ones of the plurality of nodes; and (e) connecting ones of the plurality of nodes with other ones of the plurality of nodes by ones of the plurality of edges based on the plurality of distances to obtain the graph taxonomy, wherein the plurality of distances are respectively computed using the plurality of vectors associated with the plurality of nodes.

29. A program storing device as recited in claim 28, wherein each of the plurality vectors includes a plurality of word frequencies corresponding to one of a plurality documents, and each of the plurality of nodes s corresponds to a respective one of a plurality subject categories.

30. The storage device as recited in claim 29, the program of instructions tangibly embodied in said storage device further comprising instructions to perform method steps executable by the machine of:

providing a test document; and recommending, to a user, ones of the plurality of subject categories based on an other plurality of distances between the test document and at least one of the plurality of nodes.

31. A computer program product comprising a computer usable medium having computer readable program code means embodied therein for causing a generation of a graph taxonomy of information which is represented by a plurality of vectors, the graph taxonomy including a plurality of nodes and a plurality of edges, the computer readable program code means in said computer program product comprising computer readable program code means for causing a computer to effect:

(a) receiving the information represented by the plurality of vectors in the form of a plurality of data objects;

(b) generating the plurality of nodes, each node of the plurality of nodes associated with ones of the plurality of vectors;

(c) establishing a tree hierarchy in a data memory based on the plurality of nodes;

(d) calculating a plurality of distances between ones of the plurality of nodes; and (e) connecting ones of the plurality of nodes with other ones of the plurality of nodes by ones of the plurality of edges based on the plurality of distances to obtain the graph taxonomy, wherein the plurality of distances are respectively computed using the plurality of vectors associated with the plurality of nodes.

32. A computer program product as recited in claim 31, wherein each of the plurality vectors includes a plurality of word frequencies corresponding to one of a plurality documents, and each of the plurality of nodes corresponds to a respective one of a plurality subject categories.

33. A computer program product as recited in claim 32, the computer readable program code means in said computer program product further comprising readable program code means for causing a computer to effect:

providing a test document; and recommending, to a user, ones of the plurality of subject categories based on an other plurality of distances between the test document and at least one of the plurality of nodes.

34. The method of generating the graph taxonomy of claim 1, wherein said step of calculating a pseudo-centroid for each of the plurality of clusters comprises the steps of applying a damping function to each of a set of vectors of a cluster, and calculating a vector sum of a result of the damping function.

35. The method of generating the graph taxonomy of claim 1, wherein said step of applying a damping function comprises the step of applying a predetermined function to all components of a vector.

36. The method of generating the graph taxonomy of claim 1, wherein the plurality of distances correspond to textual distances, based on words within documents.

* * * * *